Figure 5:
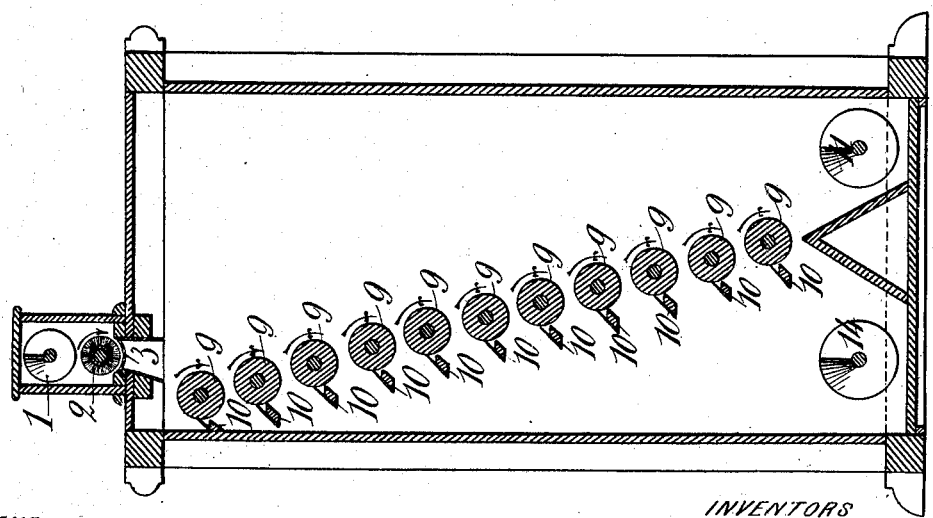

No. 757,227. PATENTED APR. 12, 1904.
A. RENAULT & G. CUSSON.
BOLTING MILL.
APPLICATION FILED FEB. 1, 1900.
NO MODEL. 3 SHEETS—SHEET 1.
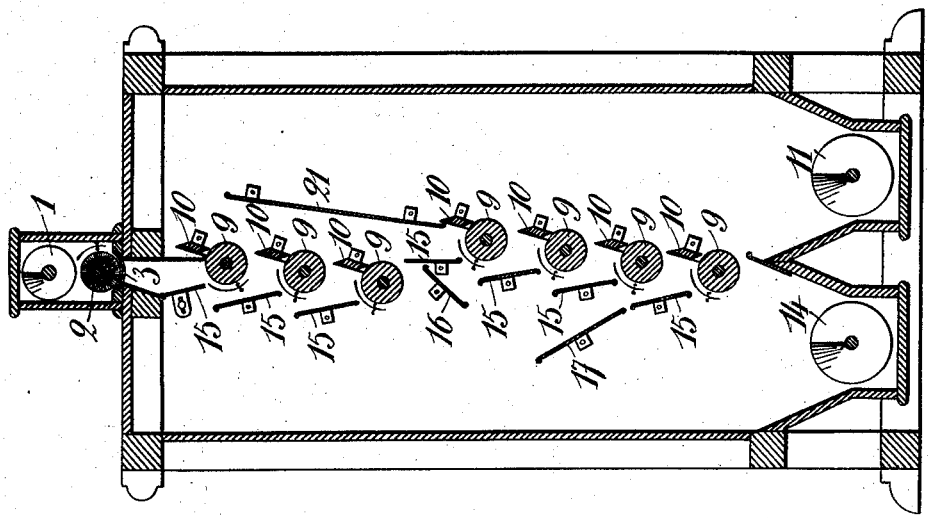
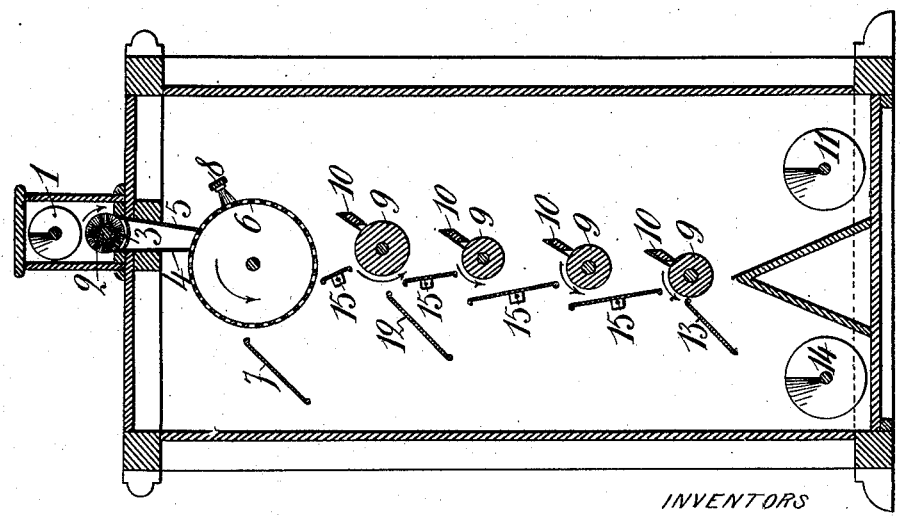
WITNESSES
W. M. Avery
C. E. Holske
INVENTORS
Anthime Renault
Georges Cusson
BY Munn & Co
ATTORNEYS.

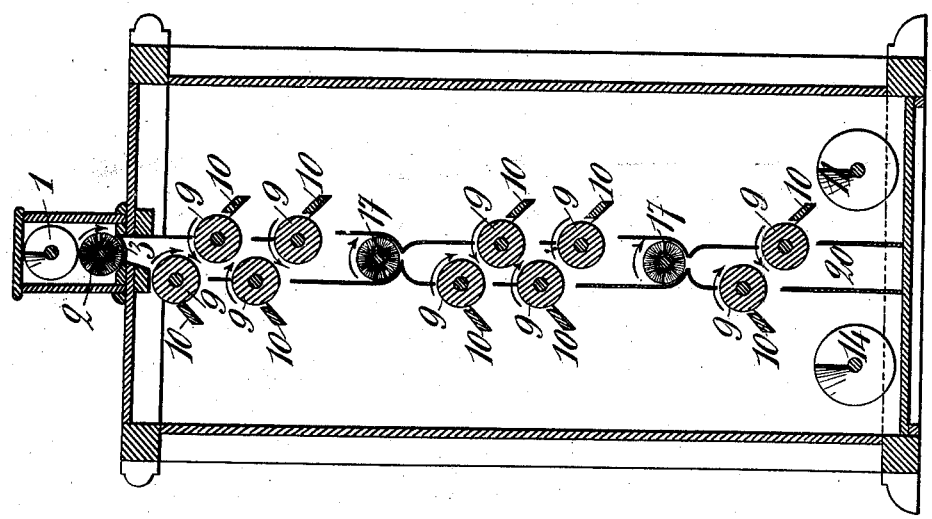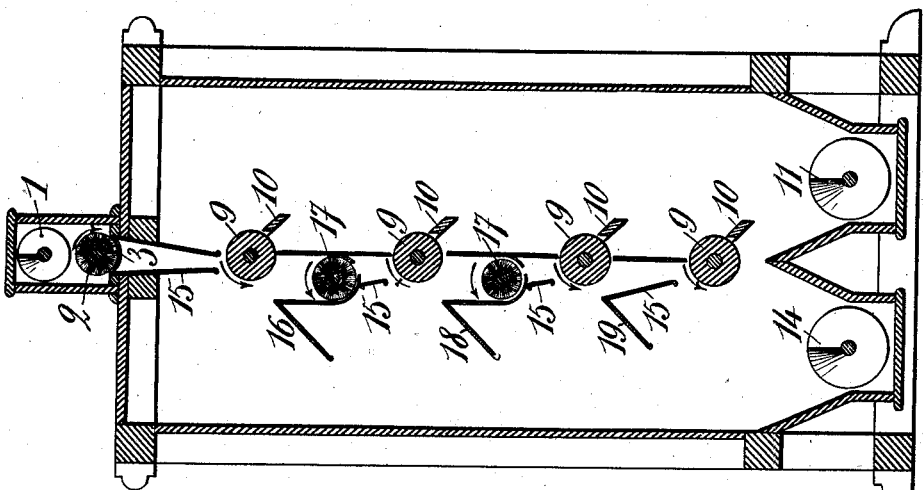

No. 757,227. PATENTED APR. 12, 1904.
A. RENAULT & G. CUSSON.
BOLTING MILL.
APPLICATION FILED FEB. 1, 1900.
NO MODEL. 3 SHEETS—SHEET 3.

WITNESSES:
W. M. Avery
C. E. Holske

INVENTORS
Anthime Renault
Georges Cusson
BY
Munn & Co
ATTORNEYS.

No. 757,227.

Patented April 12, 1904.

UNITED STATES PATENT OFFICE.

ANTHIME RENAULT, OF CHATEAUROUX, AND GEORGES CUSSON, OF ST. GENOU, FRANCE.

BOLTING-MILL.

SPECIFICATION forming part of Letters Patent No. 757,227, dated April 12, 1904.

Application filed February 1, 1900. Serial No. 3,624. (No model.)

*To all whom it may concern:*

Be it known that we, ANTHIME RENAULT, of Chateauroux, and GEORGES CUSSON, of St. Genou, (Indre,) France, have invented certain new and useful Improvements in Bolting-Mills, of which the following is a full, clear, and exact description.

This invention relates to an apparatus for purifying and sifting flour, cement, lime, phosphates, and other pulverulent materials.

We shall describe an apparatus as applied to sifting or bolting the products of a flour-mill; but the invention can be applied to other similar products.

Figures 1, 2, 3, 4, and 5 of the annexed drawings illustrate in vertical section various forms of the apparatus as applied to flour-mills.

The apparatus comprises, essentially, a certain number of smooth-surfaced cylinders arranged horizontally and placed one above another. Upon the drawings these cylinders are shown only in cross-section.

The apparatus is based upon a particular property of powdered impalpable substances, such as flour, which being thrown upon a smooth-surfaced rotating cylinder partly adheres to this surface, which carries them, while the least fine portions and the impurities do not possess this property and are thrown off with the portion of the flour not carried along.

The arrangement in Fig. 1 is suited to the sifting or bolting of the product of a grinding apparatus, such as an ordinary roller grinding-mill.

The product to be sifted or bolted is carried along by a worm 1 and is fed onto a brush 2, which divides and distributes it over a grid 3, whence it falls between two plates or guides 4 and 5 upon a cylinder 6, furnished with metallic gauze or sheathing. The grains or groats and flour all pass through the meshes of the metallic gauze. The rejected portion is thrown upon an inclined plate 7, to be submitted again to grinding. Against the cylinder 6 there works a brush 8, intended to keep the meshes free or open. The flour or grains having passed into the cylinder 6 fall upon a smooth-surfaced and rapidly-revolving cylinder 9, which is underneath. The flour adheres to this surface and is detached therefrom by a scraper 10 to reach the collecting-compartment 11. The heavier products, termed "semolina," are thrown upon an inclined plate 12 and are collected separately. The remainder of the product to be sifted falls upon the following smooth-surfaced cylinder 9, similar to the first and working in the same way, and so on upon other similar cylinders until the last one is reached, where the separation takes place of the grains from what remains of flour. The fairly-heavy grains are thrown upon the plate 13, and the fine grains fall into the collecting-compartment 14. Plates 15 determine the extent of the fall of the product to be sifted upon the cylinders. The separation of the finest parts can in reality be rendered more or less complete at each cylinder by causing the flour to be purified to fall more or less out of the vertical plane which passes through the axes of the cylinders. This adjustment is obtained by the position given to the plates 15. These can for this purpose be mounted in such a manner as to be moved when so desired. For instance, the plates may carry slotted arms engaged by stationary pins or set-screws, as shown for the uppermost plate 15 in Fig. 2. By causing the flour to fall to a point nearer the circumference of the cylinder the latter will carry less flour, but the flour will be purer. If purification is to be less careful, we then direct the product to be treated toward a point nearer the vertical plane. The yield is then greater, but the purification is less good.

Our apparatus enables us to extract what is known as "bakers' flour," (a flour especially used by bakers and pastry-cooks,) to bolt ordinary flour, and to divide or separate groats or grains. It also allows us to bolt the material coming from the grain-converters by substituting for the metallic-gauze cylinder 6 a cylinder of less diameter, having a smooth surface and being similar to the cylinders 9.

The arrangement of Fig. 2 forms, in fact, a set or group of two apparatus such as we have just described and superposed. It is intended for rebolting the flour and for replacing bolting usually termed "safety." The flour separated by the first set of three cylinders 9, arranged according to the manner previously described, is directed and guided by a plate 21 onto the second set, which contains four cylinders, by means of which it is again guided. The "waste" or rejected portion furnished by the first set of three cylinders is brought, by means of the plates 16 17, to the last cylinder of the lower set, which cylinder receives at the same time the waste which has been, with the flour, passed over the upper cylinders of this set. The final waste is thrown at 14, and the flour at 11, into compartments wherein we arrange screw conveyers, if necessary.

The apparatus shown on Fig. 3 is used for the final passage of the ground product and as a bran-brush or bran-duster. The bran mixed with flour and grains or groats having been conducted or conveyed from the chute from the mill is directed onto the first cylinder 9. The heavy bran is thrown upon an inclined plate 16, and the flour remains, adhering to this smooth-surfaced cylinder. The remainder falls upon a brush 17, which serves to again divide or dust the flour which might adhere to the small bran and to the coarse bran. This brush throws this material onto a second cylinder 9. The flour adheres to the surface thereof, and the larger part of the small bran is expelled onto the plate 18. Underneath is placed a second brush 17, whence the product falls in succession upon two cylinders 9 9, according to the arrangement previously described. The coarse bran is thrown on a plate 19. Upon the last cylinder 9 there remains only a small quantity of flour with fine grains or groats. The flour is thrown back into the compartment 11 by the scrapers 10, and the fine grains are collected in the compartment 14. In case of the application of this arrangement as a bran-brush or bran-duster the bran instead of being collected upon the inclined plates passes over the brushes and the cylinders to the bottom, falling into the compartment 14, while the extracted flour is collected in the compartment 11. To obtain this result, we have to change only the arrangement of plates.

The apparatus shown in Fig. 4 is suited to sifting and to use as a bran-duster. The flour adhering to the cylinders is collected at 11 and at 14, while at the center 20 there will remain the bran or the grains, according to whether the apparatus is used as a bran-duster or for sifting grains or groats. In the latter case the grains being mixed at 20 must pass over two or three cylinders in order to be properly separated.

The arrangement of Fig. 5 can be adopted for bolting in general. The characteristic of this arrangement consists in the fact that there is no longer an inclined plate to direct onto the cylinders the material to be bolted. The material is distributed by the same arrangements as in the preceding instances. It falls upon the first three or four cylinders, which commence to take up a certain quantity of flour. The remainder is thrown in a stream from cylinder to cylinder, so that when it has reached the last cylinder the flour has passed to the side of the compartment 14 and the separated waste or grains of whole flour will have passed to the compartment 11. The inclination of the plane in which the axes of the cylinders are arranged varies according to the speed of the latter and the species of material to be bolted.

As we have before stated, the precise arrangements can be varied according to the actual application and according to the material to be bolted. The constructions just described are examples only and suitable for flour-mills or bolting-rooms. The rotatory speed of the cylinders, their diameters, their precise construction, and the material of which they are composed will be varied according to the substance treated.

The length of the cylinder is proportioned to the output to be afforded by the apparatus. The degree of fineness of the bolting is determined by the speed of the cylinders. We may construct our apparatus with various modifications as rendered necessary without departing from the principle thereof.

We claim—

1. An apparatus for bolting or grading flour and other pulverulent materials, comprising hard smooth-surfaced rollers, revolving at a high speed and arranged at different levels and each in receiving relation to the roller next above, whereby the fine particles will be retained on the rollers by the adhesive property of said particles while the coarse particles will be thrown off, as set forth.

2. An apparatus for bolting or grading flour and other pulverulent materials, comprising hard smooth-surfaced rollers revolving at a high speed and arranged at different levels and each in receiving relation to the next roller above, whereby the fine particles will be retained on the rollers by the adhesive property of said particles while the coarse particles will be thrown off, and scrapers for removing the fine particles adhering to the said rollers, as set forth.

3. An apparatus for bolting or grading flour and other pulverulent materials, comprising hard smooth-surfaced rollers revolving at a high speed and arranged at different levels and in receiving relation to each other, whereby the fine particles will be retained on the rollers by the adhesive property of said particles while the coarse particles will be thrown off, a concave grid above the uppermost roller, a rotary brush the periphery of which is adjacent to and concentric with the grid, and means for feeding the material to the brush, as set forth.

4. An apparatus for bolting or grading flour and other pulverulent materials, comprising a plurality of rollers rotating at a high speed and having hard smooth surfaces, said rollers being arranged one above the other and adapted to retain the fine particles thereon by the adhesive property of said particles, a hollow cylinder having a perforated or reticulated sheathing arranged above the uppermost roller, and means for feeding the material to the periphery of said cylinder, as set forth.

5. An apparatus for bolting or grading flour and other pulverulent materials, comprising a plurality of rollers rotating at a high speed and having hard smooth surfaces, said rollers being arranged one above the other, a hollow cylinder having a perforated or reticulated sheathing and arranged above the uppermost roller, a spout for delivering the material to the periphery of the cylinder, a grid at the upper part of the spout, and a rotary brush adjacent to the grid, as set forth.

6. An apparatus for bolting or grading flour and other pulverulent materials, comprising a plurality of rollers having hard smooth surfaces and rotating at a high speed, said rollers being arranged one above the other and adapted to retain the fine particles thereon by the adhesive property of said particles, and means for causing the material to be delivered to the said rollers nearer to or farther from their longitudinal centers, as and for the purpose set forth.

7. An apparatus for bolting or grading flour and other pulverulent materials, comprising a series of rollers having hard smooth surfaces, said rollers being arranged one above the other and adapted to retain the fine particles thereon by the adhesive property of said particles, a scraper for each roller for removing the fine particles therefrom, a feed device for delivering the material to the uppermost roller, an outwardly and downwardly inclined plate arranged adjacent to the top and bottom rollers, and adjustable inclined plates for causing the material to be delivered to the rollers nearer to or farther from their longitudinal centers, as set forth.

8. In an apparatus for bolting or grading flour and the like, a plurality of hard smooth-surfaced rollers revolving at a high speed and arranged one above the other, means for delivering the material to the uppermost roller, and an adjustable plate for each roller for causing the material to be delivered nearer to or farther from the longitudinal center thereof, as set forth.

9. In an apparatus for bolting or grading flour and the like, a plurality of hard smooth-surfaced rollers revolving at a high speed and arranged one above the other, a scraper for each roller, means for delivering the material to the uppermost roller, and adjustable plates for causing the material to be delivered to the rollers nearer to or farther from their longitudinal centers, as set forth.

In testimony whereof we have signed our names to this specification in the presence of the two subscribing witnesses.

ANTHIME RENAULT. [L. S.]
GEORGES CUSSON. [L. S.]

Witnesses:
  AIMÉ BRODEAUX. [L. S.]
  GABRIEL SAMIE. [L. S.]